United States Patent [19]
Suematsu et al.

[11] Patent Number: 4,639,297
[45] Date of Patent: Jan. 27, 1987

[54] FLUORINATED GRAPHITES AND A PROCESS FOR PRODUCTION THEREOF

[75] Inventors: Kazumi Suematsu, Shizuoka, Japan; Kaoru Soutome, Pocatello, Id.; Tatsumi Arakawa, Shizuoka, Japan

[73] Assignee: Asahi Kasei Kogyo Kabushiki Kaisha, Tokyo, Japan

[21] Appl. No.: 763,067

[22] Filed: Aug. 5, 1985

Related U.S. Application Data

[63] Continuation of Ser. No. 584,992, Mar. 1, 1984, abandoned.

[30] Foreign Application Priority Data

Mar. 16, 1983 [JP] Japan .................. 58-42230
Jun. 22, 1983 [JP] Japan .................. 58-110999
Jul. 19, 1983 [JP] Japan .................. 58-130355

[51] Int. Cl.$^4$ .................................. C25C 1/00
[52] U.S. Cl. ..................... 204/59 F; 204/130; 204/294
[58] Field of Search ............. 204/130, 294, 59 F

[56] References Cited

U.S. PATENT DOCUMENTS

| | | | |
|---|---|---|---|
| 3,671,411 | 6/1972 | Ray et al. | 204/130 |
| 4,050,997 | 9/1977 | Heissler et al. | 204/130 |
| 4,135,995 | 1/1979 | Welch | 204/98 |
| 4,337,139 | 6/1982 | Gestaut et al. | 204/294 |

OTHER PUBLICATIONS

Chemical Abstracts vol. 96, No. 12, 3/22/82, p. 572, Abstract 93908X, "Reversible Electrochemical Formation of Graphite Fluorides from Aqueous Hydrofluoric Acid".

N. Watanabe, "Two Types of Graphite Fluorides (CF) and (C$_2$F)n, and Discharge Characteristics and Mechanisms of Electrodes of (CF)n and (C$_2$)n in Lithium Batteries," Solid State Ionics, vol. 1, Nos. 1-2, Apr. 1980, pp. 87-110.

*Primary Examiner*—R. L. Andrews
*Attorney, Agent, or Firm*—Pennie & Edmonds

[57] ABSTRACT

A fluroinated graphite having the formula $(C_xF)_n$ wherein x is a numerical value of about 2.0 to about 5.5 and n refers to an indefinite number of the recurring ($C_xF$) unit and having a crystalline structure exhibiting a peak at about 13.7° to about 15.0° in terms of an angle of $2\theta$ corresponding to the diffraction at the (001) plane in the X-ray diffraction pattern, a peak in the vicinity of 685.3 eV due to the $F_{ls}$ and two peaks in the vicinity of 287.5 eV and 284.3 eV due to the $C_{ls}$ in the spectrum of electron spectroscopy of chemical analysis, two peaks in the vicinity of 1100 cm$^{-1}$ and 1240 cm$^{-1}$ in the IR spectrum, and an electric conductivity of at least about $10^{-8} \Omega^{-1} cm^{-1}$, and being thermlly stable in air up to 200° C. from the viewpoint concerning a pattern of X-ray diffraction; and a process for producing the fluorinated graphite thereof which comprises subjecting a carbon material to electrolysis in hydrogen fluoride at a voltage of about 6.5V to about 15V at a temperature of about −40° C. to about 100° C. in the presence of an electrically conductive agent.

The fluorinated graphite has a wide variety of uses, for example, as an active material for the positive electrode of an electric cell, lubricants, stain-resistant and water and/or oil repellent materials, etc.

26 Claims, 2 Drawing Figures

FLUORINATED GRAPHITES AND A PROCESS FOR PRODUCTION THEREOF

This is a continuation of application Ser. No. 584,992, filed Mar. 1, 1984 now abandoned.

TECHNICAL FIELD

The present invention relates to a novel fluorinated graphite and a process for the production of the same.

BACKGROUND ART

As fluorinated graphites there are known polymeric fluorinated graphites having the formula of $(CF)_n$ [hereinafter referred to "$(CF)_n$"] and those having the formula $(C_2F)_n$ [hereinafter referred to "$(C_2F)_n$"] which are produced by allowing fluorine gas to react with a graphite material in a vessel maintained at a temperature of 350° C. to 600° C. (U.S. Pat. No. 4,139,474 to Watanabe et al.). It is also known that electric cells using such fluorinated graphites as an active material of a positive electrode in combination with alkali metals such as lithium as a negative electrode exhibit a high discharge voltage, a characteristic flat discharge curve and an excellent shelf life. (U.S. Pat. Nos. 3,536,532, 3,700,502 and 4,247,608). Further, it is disclosed that fluorinated graphites having the formula of $(C_xF)_n$ wherein x is a numerical value of 3.6 to 4.0 can be produced by allowing a mixed gas of fluorine and hydrogen fluoride to react with a carbon material [Chem. Ber., vol. 80, page 413 (1947)]. In the production of these fluorinated graphites, however, extensive fluorine gas must be employed and also high temperatures are required. Since such high temperatures as above are near the dissociation temperature of the C—F bond, lot of effort must be made to obtain the products at high yields. Moreover, under such conditions corrosion of the reaction vessel is extensive, and thus it may be said that these processes are disadvantageous for a production of fluorinated graphites on an industrial scale.

The present inventors have therefore made extensive studies to develop an industrially advantageous process for producing fluorinated graphites avoiding the defects of the conventional techniques. As a result, the inventors have found that this purpose can be accomplished by electrolytically fluorinating a carbon material in hydrogen fluoride and that the fluorinated graphite thus produced will be novel.

DISCLOSURE

Figure 1:
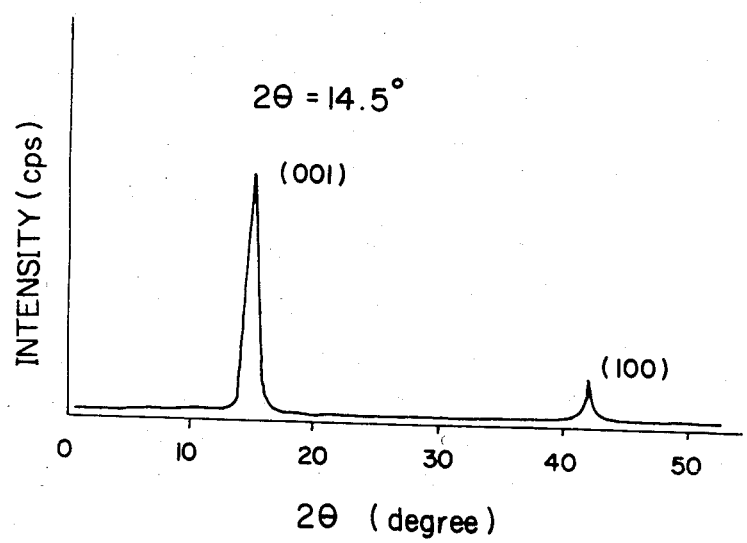
FIG. 1 shows the X-ray diffraction pattern of a typical fluorinated graphite in Example 1 of the present invention.

The present invention relates to a fluorinated graphite having the formula $(C_xF)_n$ wherein x is a numerical value of about 2.0 to about 5.5 and n refers to an indefinite number of the recurring $(C_xF)$ unit and having a crystalline structure exhibiting a peak at about 13.7° to about 15.0° in terms of an angle of $2\theta$ corresponding to the diffraction at the (001) plane in the X-ray diffraction pattern, a peak in the vicinity of 685.3 eV due to the $F_{1S}$ and two peaks in the vicinity of 287.5 eV and 284.3 eV due to the $C_{1S}$ in the spectrum of electron spectroscopy of chemical analysis (hereinafter referred to as "ESCA"), two peaks in the vicinity of 1100 cm$^{-1}$ and 1240 cm$^{-1}$ in the IR spectrum, an electric conductivity of at least about $10^{-8}\Omega^{-1}$ cm$^{-1}$ and being thermally stable in air up to 200° C. from the viewpoint of an X-ray diffraction pattern.

The present invention also relates to a process for producing a fluorinated graphite as described above which comprises subjecting a carbon material to electrolysis in hydrogen fluoride at a voltage of about 6.5 V to about 15 V at a temperature of about −40° C. to about 100° C. in the presence of an electrically conductive agent.

Exemplary carbon materials which can be employed in the present invention are easily graphitizable carbons and include petroleum coke, pitch, meso-phase pitch, calcined vinyl chloride, carbon whisker, graphite obtained by heat treatment thereof and natural graphite. Among these carbon materials, meso-phase pitch, heat-treated meso-phase pitch and natural graphite are preferred, and heat-treated meso-phase pitch is more preferred.

The shape of the carbon material may be in the form of powder, flakes, granules, whiskers, fibers or sheets, and the carbon materials may be employed in layers or in bundles, and the size of these layers or bundles is not limited as long as their width is smaller than the effective electrode area. In order to increase the rate of reaction, the thickness or the diameter of a sheet or a fiber is preferably at most about 5 mm, more preferably at most 2 mm. Any amount of the carbon materials may be employed if they are provided within the effective electrode area.

The apparatus for producing the fluorinated graphite of the present invention may be typically made of copper, nickel, silver, stainless steel or any combination thereof and may have an anode and a cathode made of nickel, stainless steel or copper. The electrodes may be in the form of plates, nets or concentric cylinders. It is preferred to employ cylindrical electrodes which have the following advantages:

(a) Fluorination of the carbon material proceeds rapidly and uniformly and thus the current efficiency can be improved, and the electrolysis time can be shortened.

(b) The batchwise amount of the carbon material can be increased.

(c) The discharge characteristics of an electric cell using a fluorinated graphite as an active material of a positive electrode are improved.

The cylindrical electrodes which can be preferably employed in the present invention are formed by a combination of two cylinders which are concentrically placed and whose distance therebetween is uniform. The cylinders may not be necessarily circular and one electrode encircles the other electrode at a substantially equal distance. The cylinders may be porous or netlike, and part of the cylinders may be missing or the inner-positioned cylinder may be replaced by a rod.

The electrolytic fluorination according to the present invention proceeds at the anode. Accordingly, it is preferred that the carbon material be disposed on the anode or in the vicinity of the anode. As an exemplary method, the carbon material is uniformly spread on the anode and fixed with a net of polytetrafluoroethylene. Into an electrolytic vessel are charged the carbon material and hydrogen fluoride containing an electrically conductive agent, and an electric current is then applied under the prescribed conditions.

The electrolytic temperature employed is typically about −40° C. to about 100° C., preferably about −30° C. to 20° C. When the electrolytic temperature is lower than about −40° C., the velocity of electrolytic fluorination becomes unfavorably low from an industrial view-point. On the other hand, when the temperature is higher than 100° C., the pressure of hydrogen fluoride is increased, and hence it is inconvenient from the viewpoint of operating the electrolysis. The voltage applied is typically about 6.5 V to about 15 V, preferably about 7 V to about 10 V. When the voltage is lower than about 6.5 V, the electric current density is decreased, and accordingly a long reaction time will be required for the electrolysis. On the other hand, when the voltage is higher than 15 V, the operation of the electrolysis becomes dangerous, because of the generation of a large amount of fluorine gas.

The electrolytic fluorination of the present invention is conducted in an atmosphere of dried air, for example, treated with a dehydrating agent such as calcium chloride, potassium hydroxide and sulfuric acid, or in an inert gas such as nitrogen, argon and helium.

Exemplary electrically conductive agents which can be employed in the present invention include water and metal salts. When water is employed, it is preferred that the weight ratio of water to hydrogen fluoride be kept in the range of about 0.0001 to about 0.01. When the weight ratio of water to hydrogen fluoride is less than about 0.0001, the electrical conductivity becomes smaller and the current density is reduced and as a result, the electrolysis requires a long period of time. On the other hand, when weight ratios of water to hydrogen fluoride of more than about 0.01 are used, the efficiency of fluorination is decreased and the properties of an electric cell of the fluorinated graphite produced are adversely affected.

Exemplary metal salts which can be employed as the electrically conductive agent in the present invention include metal fluorides such as sodium fluoride, potassium fluoride, calcium fluoride and magnesium fluoride. In order to maintain an appropriate electrical conductivity and to prevent excess corrosion of the electrodes, the amount of the metal fluorides employed is preferably in the range of about 1% by weight to about 20% by weight based on the weight of the hydrogen fluoride.

In the production of the fluorinated graphite of the present invention the quantity of electricity applied is typically in the range of about $2 \times 10^3$ coulombs to about $1 \times 10^6$ coulombs per gram of the carbon material. The fluorination reaction proceeds very rapidly, and compounds having a composition of a certain range of the ratio of carbon to fluorine can be produced in a very short period of time.

The external gloss of the product formed is slightly lost but the color and the shape of the starting carbon material are maintained in the products. Generally, the weight of the products shows an increase of about 30% to about 80% over that of the starting carbon material. The elemental analysis and the spectrum analysis show that the product is a fluorinated carbon compound containing covalent bonds.

Figure 2:
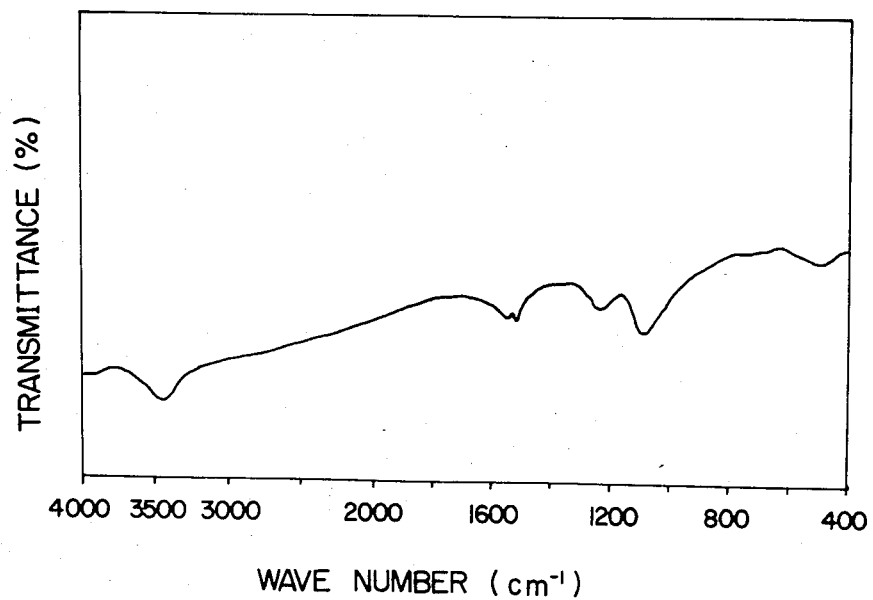
FIG. 2 shows the IR spectrum of a typical fluorinated graphite in Example 10 of the present invention.

According to the elemental analysis the fluorinated graphite of the present invention has a composition of $(C_xF)_n$ wherein x is about 2.0 to about 5.5 and n refers to an indefinite number of the recurring $(C_xF)$ unit. According to the X-ray diffraction pattern a peak can be observed in the range of about 13.7° to about 15.0° in terms of an angle of $2\theta$ corresponding to the diffraction at the (001) plane. This corresponds to an interlayer spacing of about 6.46 Å to about 5.90 Å. FIG. 1 shows a representative example of the X-ray diffraction pattern of the fluorinated graphite of the present invention. According to the ESCA spectrum of the fluorinated graphite of the present invention, a peak can be observed in the vicinity of 685.3 eV due to the $F_{1S}$ and two peaks in the vicinity of 287.5 eV and 284.3 eV due to the $C_{1S}$. The fluorinated graphite of the present invention has an electric conductivity of at least about $1 \times 10^{-8}$ $(ohm.cm)^{-1}$ and a thermal stability, i.e., no structural change occurring up to 200° C. in air from the viewpoint of an X-ray diffraction pattern, and no weight loss being observed up to 400° C. in a nitrogen atmosphere by thermogravimetric analysis. The IR spectrum of the fluorinated graphite of the present invention shows two absorptions characteristic of the stretching vibration of the F—C bond in the vicinity of 1100 cm$^{-1}$ and 1240 cm$^{-1}$ which is different from the absorptions of the conventional fluorinated graphite. FIG. 2 shows a representative IR spectrum of the fluorinated graphite of the present invention, and the intensity ratio of the peak in the vicinity of 1100 cm$^{-1}$ to the peak in the vicinity of 1240 cm$^{-1}$ varies depending upon the electrolytic conditions and the fluorination ratio.

The fluorinated graphites of the present invention have a wide variety of uses, for example, as active materials for the positive electrode of an electric cell, lubricants, stain-resistant and water and/or oil repellent materials, etc.

The present invention is hereunder described in greater detail by reference to working examples, to which the scope of the present invention is by no means limited.

EXAMPLE 1

The electrolytic vessel employed was a cylinder made of copper-nickel alloy having an internal volume of 660 ml equipped with a reflux condenser. An anode and a cathode employed as electrodes were both nickel plates having a thickness of 0.5 mm to the electrode distance was 0.5 cm and their effective area was 76 cm$^2$. On the anode 1.0 g of pitch type graphite monofilaments having a diameter of 10 μm whose X-ray spacing was 3.36 Å and a length of 5 cm (trade mark "Thornel P-55S" manufactured by Union Carbide Corporation, U.S.A.) was uniformly spread and fixed with a polytetrafluoroethylene thread.

Into the electrolytic vessel was charged 650 ml of hydrofluoric acid containing 1 ml of water, and the electrolysis was conducted in an argon atmosphere for 8 hours under conditions such that the average current density was 1.5 A/cm$^2$, the voltage applied was 8 V and the bath temperature was −20° C. Then 100 ml of hydrofluoric acid containing 1 ml of water was additionally charged into the electrolytic vessel and the electrolysis was conducted further for 16 hours under the same conditions as described above. The total quantity of electricity applied was $13 \times 10^4$ coulomb per gram of the carbon monofilaments.

DETAILED DESCRIPTION OF FIG. I

The color of the product obtained remained black, and the volume of the monofilaments was increased to give the monofilaments a diameter of 14 μm and the increase in weight was 56%. According to an elemental analysis, the contents was fluorine and carbon were 36% by weight and 64% by weight, respectively, which corresponded to a composition of $(C_{2.8}F)_n$. According to the X-ray diffraction pattern, a peak was observed at 14.5° ($2\theta$) as shown in FIG. 1 while the peak of the starting carbon material at 26.5° ($2\theta$) corresponding to the diffraction at the (002) plane was not observed, indicating that the conversion of the carbon material was 100%. The product had an interlayer spacing of 6.10 Å, and exhibited one peak at 1100 cm$^{-1}$ and another peak at 1200 cm$^{-1}$ in the IR spectrum, one peak at 685.1 eV due to the $F_{1S}$ and two peaks at 287.5 eV and 284.3 eV due to the $C_{1S}$ in the ESCA spectrum. The product was stable up to 200° C. in air from the viewpoint of an X-ray diffraction pattern and did not show weight loss up to 400° C. in a nitrogen atmosphere. The color of the product was black and the electric conductivity was 0.5$\Omega^{-1}$cm$^{-1}$.

EXAMPLE 2

The procedures of Example 1 were repeated except that the electrolytic voltage was 9 V, the average current density was 2.5 A/dm$^2$ and the total quantity of electricity applied was 21.6×10$^4$ coulomb. The product obtained increased in weight by 64%. The analysis showed that the product had a composition of $(C_{2.5}F)_n$. According to the X-ray diffraction pattern, a sharp peak was observed at 14.4° ($2\theta$), and the conversion of the starting carbon material was 100%. The product had an interlayer spacing of 6.15 Å, and exhibited one peak at 1080 cm$^{-1}$ and another peak at 1220 cm$^{-1}$ in the IR spectrum, one peak at 685.3 eV due to the $F_{1S}$ and two peaks at 287.4 eV and 284.1 eV due to the $C_{1S}$ in the ESCA spectrum, and did not change up to 200° C. in air from the viewpoint of an X-ray diffraction pattern. The temperature at which weight loss in a nitrogen atmosphere started was 400° C., the color of the product was black and the electric conductivity was 10$^{-2}\Omega^{-1}$cm$^{-1}$.

EXAMPLE 3

The procedures of Example 1 were repeated except that 0.5 g of a sheet having a thickness of 0.2 mm having been molded from a mixture of graphitized petroleum coke and 10% by weight of polytetrafluoroethylene powder was stuck on the anode as a carbon material with a polytetrafluoroethylene fiber. The increase in weight of the product was 69%. The elemental analysis showed that the product had a composition of $(C_{2.3}F)_n$. According to the X-ray diffraction pattern, a peak was observed at 14.3° ($2\theta$), and the conversion of the starting carbon material was 100%. The product exhibited one peak at 1080 cm$^{-1}$ and another peak at 1230 cm$^{-1}$ in the IR spectrum, one peak at 685.5 eV due to the $F_{1S}$ and two peaks at 287.5 eV and 284.5 eV due to the $C_{1S}$ in the ESCA spectrum. The product was stable in air up to 200° C. from the viewpoint of an X-ray diffraction pattern. The initial temperature of onset of thermally induced weight loss in air was 400° C., the color of the product was black and electric conductivity was 10$^{-3}\Omega^{-1}$cm$^{-1}$.

EXAMPLES 4 TO 10

The procedures of Example 1 were repeated except that graphitized whiskers obtained by the heat treatment of benzene at high temperatures having a diameter of 5 μm and a length of 1 to 5 cm were employed. The relationship between the total quantity of electricity applied and the product obtained is shown in Table 1.

TABLE 1

| Example No. | Amount of whiskers (g) | Total Quantity of Electricity Applied (coulomb/g) | Composition of Product | X-ray Diffraction $2\theta$ (degrees) |
| --- | --- | --- | --- | --- |
| 4 | 0.70 | 125,000 | $(C_{3.9}F)_n$ | 14.50 |
| 5 | 0.53 | 160,000 | $(C_{3.8}F)_n$ | 14.40 |
| 6 | 0.42 | 200,000 | $(C_{3.6}F)_n$ | 14.35 |
| 7 | 0.28 | 300,000 | $(C_{3.3}F)_n$ | 14.3 |
| 8 | 0.21 | 400,000 | $(C_{2.8}F)_n$ | 14.1 |
| 9 | 0.13 | 780,000 | $(C_{2.5}F)_n$ | 14.0 |
| 10 | 0.10 | 1,000,000 | $(C_{2.1}F)_n$ | 13.8 |

DETAILED DESCRIPTION OF FIG. 2

All the products were black in color and had an electric conductivity of 10$^{-7}\Omega^{-1}$ cm$^{-1}$(Example 10) to 25$^{-1}\Omega^{-1}$cm$^{-1}$ (Example 4), which shows a relationship that the electric conductivity was higher with a smaller of high electric conductivity corresponding to a low in air up to 200° C. and showed two absorptions characteristic of the stretching vibration of F—C the bond, i.e., one peak in the vicinity of 1100 cm$^{-1}$ and another peak in the vicinity of 1240 cm$^{-1}$ in the IR spectra, and one peak in the vicinity of 685.3 eV due to the $F_{1S}$ and two peaks in the vicinity of 287.5 eV and 284.3 eV due to the $C_{1S}$. FIG. 2 illustrates the IR spectrum of the product obtained in Example 10.

EXAMPLE 11

Around a cylinder made of nickel having a diameter of 3 cm was uniformly wound 0.8 g of pitch type carbon fibers having been heat-treated at 2700° C. for 10 minutes, which was used as an anode. Outside of the anode was placed a cylinder made of nickel as a cathode at an electrode distance of 5 mm. The assembly thus formed was immersed in hydrofluoric acid containing 0.1% by weight of water, and the electrolysis was conducted at −20° C. at a constant voltage of 8 V for 4 hours. The total quantity of electricity applied was 8.2×10$^4$ coulomb. According to the elemental analysis, the product obtained had a composition of $(C_{3.0}F)_n$ and according to the X-ray diffraction pattern, it had a peak at 14.6° ($2\theta$) and the conversion of the starting carbon material was 100%. The product exhibited one peak at 1100 cm$^{-1}$ and another peak at 1220 cm$^{-1}$ in the IR spectrum and one peak at 685.1 eV due to the $F_{1S}$ and two peaks at 287.8 eV and 284.6 eV due to the $C_{1S}$ in the ESCA spectrum. The electric conductivity was 3.0$\Omega^{-1}$cm$^{-1}$.

EXAMPLES 12 TO 16

The procedures of Example 11 were repeated except that various carbon materials as set forth in Table 2 were employed and the total quantity of electricity applied was 7.7×10$^4$ coulomb/g. The results are shown in Table 2.

TABLE 2

| Example No. | Carbon Material Kind | Amount (g) | Composition of Product | X-ray Diffraction $2\theta$ (degrees) |
| --- | --- | --- | --- | --- |
| 12 | natural graphite | 1.0 | $(C_{2.8}F)_n$ | 14.4 |
| 13 | pitch type carbon fiber fabric | 1.0 | $(C_{3.3}F)_n$ | 14.65 |
| 14 | carbon whisker (diameter: 5 μm) | 0.2 | $(C_{2.8}F)_n$ | 14.3 |
| 15 | petroleum coke having been | 1.0 | $(C_{4.0}F)_n$ | 14.65 |

TABLE 2-continued

| Example No. | Carbon Material Kind | Amount (g) | Composition of Product | X-ray Diffraction $2\theta$ (degrees) |
|---|---|---|---|---|
| | treated at 2,600° C. for 10 minutes | | | |
| 16 | sheet graphite* | 0.7 | $(C_{3.0}F)_n$ | 14.5 |

*Natural graphite was kneaded with polytetrafluoroethylene powder at a ratio of 10 W/W %, and the mixture was molded into a sheet having a thickness of 1000 μm.

All the products exhibited one peak in the vicinity of 1100 cm$^{-1}$ and another peak in the vicinity of 1240 cm$^{-1}$ in the IR spectrum and one peak in the vicinity of 685.3 eV due to the $F_{1S}$ and two peaks in the vicinity of 287.5 eV and 284.3 eV due to the $C_{1S}$ in the ESCA spectrum.

EXAMPLES 17 TO 20

The procedures of Example 11 were repeated except that the electrolytic temperature was varied as set forth in Table 3 and that the amount of the carbon material used was 1.0 g. The results are shown in Table 3.

TABLE 3

| Example No. | Electrolytic Temperature (°C.) | Composition of Product | X-ray Diffraction $2\theta$ (degrees) |
|---|---|---|---|
| 17 | −15 | $(C_{3.1}F)_n$ | 14.7 |
| 18 | −10 | $(C_{3.0}F)_n$ | 14.6 |
| 19 | −5 | $(C_{2.95}F)_n$ | 14.6 |
| 20 | 0 | $(C_{3.1}F)_n$ | 14.7 |

As is clearly understood from Table 3, the properties of the products are hardly affected by the electrolytic temperature. All the products had an electric conductivity of around $5\Omega^{-1}$cm$^{-1}$ and excellent thermal stability.

EXAMPLE 21

The procedures of Example 1 were repeated except that 15 g of sodium fluoride were employed as an electrically conductive agent instead of water. The product obtained showed an increase in weight by 50%. According to the X-ray diffraction pattern, a peak was observed at 14.7° ($2\theta$), and the conversion of the starting carbon material was 100%. The product had an interlayer spacing of 6.03 Å to was thermally stable in air up to 200° C. and had an electric conductivity of $8\Omega^{-1}$cm$^{-1}$.

EXAMPLE 22

The procedures of Example 1 were repeated except that 10 g of potassium fluoride were employed as an electrically conductive agent instead of water. The product obtained showed an increase in weight by 50% by weight. According to the elemental analysis, the product obtained had a composition of $(C_{4.2}F)_n$. According to the X-ray diffraction pattern, a peak was observed at 15.0° ($2\theta$), and the conversion of the starting carbon material was 100%. The product had an interlayer spacing of 5.90 Å to was thermally stable in air up to 200° C. and had an electric conductivity of $15\Omega^{-1}$cm$^{-1}$.

While the invention has been described in detail and with reference to specific embodiments thereof, it will be apparent to one skilled in the art that various changes and modifications can be made therein without departing from the spirit and scope thereof.

What is claimed is:

1. A process for producing a fluorinated graphite intercalation compound having the formula $(C_xF)_n$ wherein x is a numerical value of about 2.0 to about 5.5 and n refers to an indefinite number of recurring $(C_xF)$ units and having a crystalline structure exhibiting a peak at about 13.7° to about 15.0° in terms of an angle of $2\theta$ corresponding to the diffraction of the (001) plane in the X-ray diffraction pattern, a peak in the vicinity of 685.3 eV due to the $F_{1S}$ and two peaks in the vicinity of 287.5 eV and 284.3 eV due to the $C_{1S}$ in the spectrum of electron spectroscopy of chemical analysis, two peaks in the vicinity of 1100 cm$^{-1}$ and 1240 cm$^{-1}$ in the IR spectrum, an electric conductivity of at least about $10^{-8}\Omega^{-1}$cm$^{-1}$; and being thermally stable in air up to 200° C. from the viewpoint concerning a pattern of X-ray diffraction, which process comprises subjecting a carbon material to electrolysis in hydrogen fluoride at a voltage of about 6.5 V to about 15 V at a temperature of about −40° C. to about 100° C. in the presence of water or a metal fluoride for a sufficient time to fluorinate the carbon material throughout.

2. The process of claim 1, wherein the water is employed in a range of a weight ratio of water to the hydrogen fluoride of about 0.0001 to about 0.01.

3. The process of claim 1, wherein the metal fluoride is employed in an amount range of about 1% by weight to about 20% by weight based on the weight of the hydrogen fluoride.

4. The process of claim 1, wherein the metal fluoride is sodium fluoride, potassium fluoride, calcium fluoride or magnesium fluoride.

5. The process of claim 1, wherein the electrolysis is conducted in dried air or an inert gas.

6. The process of claim 4, wherein the inert gas is nitrogen, argon or helium.

7. The process of claim 1, wherein the voltage is about 7 V to about 10 V.

8. The process of claim 1, wherein the electolytic temperature is about −30° C. to about 20° C.

9. The process of claim 1, wherein the electrodes are concentric cylindrical electrodes.

10. The process of claim 1, wherein the carbon material is an easily graphitizable carbon.

11. The process of claim 10, wherein the easily graphitizable carbon is petroleum coke, pitch, meso-phase pitch, calcined vinyl chloride, carbon whisker, graphite obtained by heat treatment thereof or natural graphite.

12. The process of claim 11, wherein the easily graphitizable carbon is meso-phase pitch.

13. The process of claim 11, wherein the easily graphitizable carbon is natural graphite.

14. The process of claim 11, wherein the easily graphitizable carbon is heat-treated meso-phase pitch.

15. A process for producing a fluorinated graphite intercalation compound have the formula $(C_xF)_n$ wherein x is a numerical value of about 2.0 to about 5.5 and n refers to an indefinite number of recurring $(C_xF)$ units and having a crystalline structure exhibiting a peak at about 13.7° to about 15.0° in terms of an angle of $2\theta$ corresponding to the diffraction at the (001) plane in the X-ray diffraction pattern, a peak in the vicinity of 685.3 eV due to the $F_{1S}$ and two peaks in the vicinity of 287.5 eV and 284.3 eV due to the $C_{1S}$ in the spectrum of electron spectroscopy of the chemical analysis, two peaks in the vicinity of 1100 cm$^{-1}$ and 1240 cm$^{-1}$ in the IR spectrum, an electric conductivity of at least about $10^{-8}\Omega^{-1}cm^{-1}$, and being thermally stable in air up to 200° C. from the viewpoint concerning a pattern of X-ray diffraction, which process comprises subjecting a carbon material to electrolysis in hydrogen fluoride in the presence of water of a metal fluoride at sufficient electrolysis conditions and for a sufficient time to produce uniform fluorination throughout the carbon material.

16. The product produced by the process of claim 1.

17. The product produced by the process of claim 15.

18. The process of claim 1 wherein the carbon material is subjected to electrolysis for a period of between about 4 and 24 hours.

19. The process of claim 15 wherein the carbon material is subjected to electrolysis for a period of between about 4 and 24 hours.

20. The process of claim 15 wherein the electrolysis is conducted at a voltage of about 6.5 V to about 15 V at a temperature of about −40° C. to about 100° C.

21. The process of claim 15 wherein the electrolysis is conducted with a quantity of electricity of about $2 \times 10^3$ to $1 \times 10^6$ coulombs per gram of carbon material.

22. A fluorinated graphite intercalation compound having the formula $(C_xF)_n$ wherein x is a numerical value of about 2.0 to about 5.5 and n refers to an indefinite number of recurring $(C_xF)$ units and having a crystalline structure exhibiting a peak at about 13.7° to about 15.0° in terms of an angle of $2\theta$ corresponding to the diffraction at the (001) plane in the X-ray diffraction pattern, a peak in the vicinity of 685.3 eV due to the $F_{1S}$ and two peaks in the vicinity of 287.5 eV and 284.3 eV due to the $C_{1S}$ in the spectrum of electron spectroscopy of chemical analysis, two peaks in the vicinity of the 1100 cm$^{-1}$ and 1240 cm$^{-1}$ in the IR spectrum, an electric conductivity of at least about $10^{-8}\Omega^{-1}cm^{-1}$, and being thermally stable in air up to 200° C. from the viewpoint concerning a pattern of X-ray diffraction; said compound being fluorinated throughout due to electrolysis of a carbon material in hydrogen fluoride with a quantity of electricity of about $2 \times 10^3$ to $1 \times 10^6$ coulombs per gram of carbon material in the presence of an electrically conductive agent.

23. The fluorinated graphite intercalation compound of claim 22 wherein the electrically conductive agent is water or a metal fluoride.

24. The fluorinated graphite intercalation compound of claim 23 wherein the metal fluoride is sodium fluoride, potassium fluoride, calcium fluoride, or magnesium fluoride.

25. A fluorinated graphite intercalation compound having the formula $(C_xF)_n$ wherein x is a numerical value of about 2.0 to about 5.5 and n refers to an indefinite number of recurring $(C_xF)$ units and having a crystalline structure exhibiting a peak at about 13.7° to about 15.0° in terms of an angle of $2\theta$ corresponding to the diffraction at the (001) plane in the X-ray diffraction pattern, a peak in the vicinity of 685.3 eV due to the $F_{1S}$ and two peaks in the vicinity of 287.5 eV and 284.3 eV due to the $C_{1S}$ in the spectrum of electron spectroscopy of chemical analysis, two peaks in the vicinity of 1100 cm$^{-1}$ and 1240 cm$^{-1}$ in the IR spectrum, an electric conductivity of at least about $10^{-8}\Omega^{-1}$ cm$^{-1}$, and being thermally stable in air up to 200° C. from the viewpoint concerning a pattern of X-ray diffraction; said compound being uniformly fluorinated throughout due to electrolysis of a carbon material in hydrogen fluoride in the presence of an electrically conductive agent.

26. The process of claim 1 wherein the electrolysis is conducted with a quantity of electricity of about $2 \times 10^3$ to $1 \times 10^6$ coulombs per gram of carbon material.

* * * * *